July 28, 1959 D. G. GRENLEY ET AL 2,897,100
COATING POLYETHYLENE WITH HALOETHYLENE POLYMERS AND
COMPOSITE ARTICLES THEREBY OBTAINED
Filed Dec. 3, 1956 2 Sheets-Sheet 2

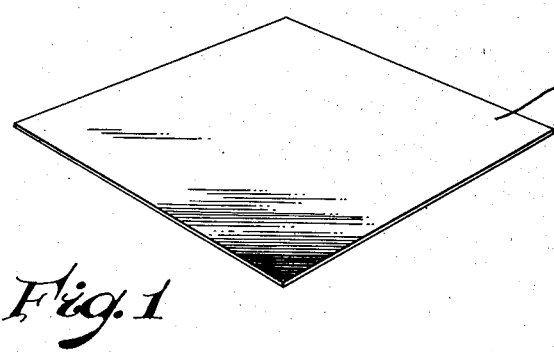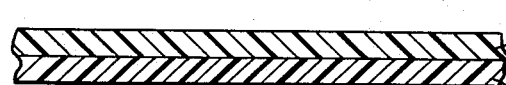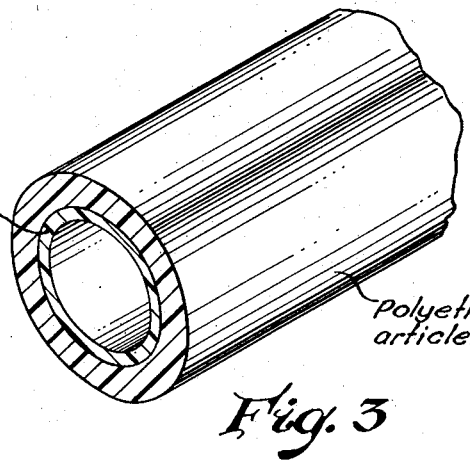

Preparing a coating composition consisting of
a latex emulsion of a haloethylene
polymer resin by incorporating in the
latex a minor proportion of a surface
active sodium salt of condensed
arylsulfonic acids polyelectrolyte

↓

Applying a layer of the
coating composition over
surface of polyethylene
article to be coated

↓

Drying applied
coating

↓

Obtaining coated polyethylene
article having solid deposit
of haloethylene polymer
resin on its surface

Fig. 4

INVENTORS.
Dallas G. Grenley
Harold J. Townsend
BY
Griswold & Burdick
ATTORNEYS

United States Patent Office 2,897,100
Patented July 28, 1959

2,897,100

COATING POLYETHYLENE WITH HALOETHYLENE POLYMERS AND COMPOSITE ARTICLES THEREBY OBTAINED

Dallas G. Grenley, Midland, and Harold J. Townsend, Saginaw, Mich., assignors to The Dow Chemical Company, Midland, Mich., a corporation of Delaware Application December 3, 1956, Serial No. 625,938

16 Claims. (Cl. 117—138.8)

This invention relates to a method for coating polyethylene films and other shaped articles with resinous layers comprised of haloethylene polymers and copolymers and to the coated articles, particularly films, which may thereby be obtained.

Films and other shaped and molded articles of polyethylene have many attractive characteristics including, in general, good physical properties and, in particular, excellent behavior and resistance to embrittlement at low temperatures. The latter feature is not readily obtainable in articles which are comprised of haloethylene polymers and haloethylene polymer resins which may consist of various polymers and copolymers of vinyl halides and of vinylidene halides including, especially, copolymers of vinylidene chloride and vinyl chloride and copolymers of vinylidene chloride and acrylonitrile, which vinylidene halide copolymers frequently are generically described as being sarans. On the other hand, film structures and other shaped articles and coatings prepared from haloethylene polymer resins and particularly from sarans have an outstanding ability to provide particularly effective barriers against the transmission or permeation of gases or vapors. Furthermore, haloethylene polymer resins are usually not as prone to becoming surface scuffed or marred in use as are the typical polymers of ethylene.

Despite the obvious beneficial utility as a flexible, vapor-proof film article or other container which would be especially well suited for low temperature employment that could be provided by composite structures comprised of polyethylene film or other shaped or molded articles coated with or laminated to haloethylene polymer resin compositions, much difficulty has been experienced in their derivation. This is because of the inefficient bonding and poor adherence that is experienced when haloethylene polymer resin coatings or laminating films are attempted to be formed into composite structures with polyethylene articles. Polyethylene film and other articles, as is well known, commonly have a smooth and sleek, relatively slippery and wax-like surface which is poorly adapted to provide for suitable adhesion or anchorage of applied materials by mere physical attachment. Furthermore, the relatively inert chemical nature of polyethylene resists the efficient attachment of most materials by chemical interlinkage or bonding.

It is among the principal objects of the present invention to provide an efficient and effective method for coating polyethylene films and other articles with tightly-adhering integral layers of haloethylene polymer resin compositions including, in particular, saran compositions. It is also an object of the invention to provide utile composite structures of polyethylene films and articles and haloethylene polymer resin coatings on the articles which are particularly adapted for employment at relatively low temperatures as flexible, vapor-proof materials for packaging and the like. Other objects and advantages will be apparent in the following description and specification.

According to the invention, polyethylene articles may be effectively provided with a tightly-adhering and firmly anchored coating of a haloethylene polymer resin by a method which comprises incorporating a minor proportion of a surface active polyelectrolyte material that contains a plurality of ionizable groups in its molecule and is of the general class that may be delineated as being a neutral sodium salt of a condensed arylsulfonic acid selected from the group of such surface active materials which consists of those popularly known as "Tamol X," "Tamol N" and mixtures thereof, in a coating composition consisting of a latex emulsion of said haloethylene polymer resin; applying a layer of the latex emulsion of the haloethylene polymer resin in which is incorporated said surface active material over the polyethylene surface; and subsequently drying the applied latex emulsion of the haloethylene polymer resin to effect a solid deposition of resin on the surface of the polyethylene.

The composite articles (as illustrated by the composite film which is depicted perspectively in Figure 1 and cross-sectionally in Figure 2 and by the internally coated tubular article shown perspectively in Figure 3 of the accompanying drawing), which advantageously may be obtained by practice of the present invention, possess to an unusual degree many of the desirable and beneficial attributes and properties of both polyethylene and haloethylene polymer resins. They are quite pliable while being strong, tough and tear resistant and retain their strength and flexibility at relatively low temperatures. They have a more scuff-resistant and harder-to-mar surface than plain polyethylene and are extremely impermeable to gases and vapors. The composite articles are possessed of a strong and effective bond between the applied coating of haloethylene polymer resin and the coated polyethylene article. Figure 4 of the accompanying drawing schematically illustrates the present method in the manner of a flow sheet diagram.

In most instances, the applied coating is extremely difficult if not completely impossible to strip from the surface of the polyethylene film or other article by ordinary physical methods. In addition, such composite structures have an unusual transparency and freedom from haze when they are in relatively thin sections in comparison with conventional polyethylene film and other thin articles. For example, composite film structures in accordance with the invention may generally be obtained with only a very slight degree of haziness which is not discernible upon ordinary visual inspection and which has been reduced almost to the vanishing point from the haze that is present in the original polyethylene film.

Composite film structures may advantageously be prepared in accordance with the present invention. Such film structures have particular utility as wrapping and packaging materials for foodstuffs and other articles which are intended to be handled or maintained and stored at relatively low temperatures in a refrigerated or frozen condition. Besides providing protection as a strong and tough flexible covering, they also more effectively prevent the dehydration of the packaged articles and avoid development of the condition known as "freezer burn" which frequently occurs in inadequately protected frozen foods. Other composite structures including tubes, flexible bottles and other containers such as cartons and boxes may also be made with advantage by practice of the invention.

Advantageously, relatively thin polyethylene films are employed in order to obtain composite film structures according to the invention. Beneficial results, for example, are readily obtainable with films having a thickness which is not greatly in excess of about 20 mils. It is frequently even more beneficial to employ polyethylene films that have a thickness between about 0.5 and 5.0 mils. The polyethylene film which is employed in the practice of the present invention as well as other polyethylene articles may be derived from polyethylene of any nature. The polymers of ethylene which are employed may, for example, be similar to those which sometimes are referred to as "polythenes" and which may be obtained by polymerizing ethylene in a basic aqueous medium and in the presence of polymerization-favoring quantities of oxygen under relatively high pressures in excess of 500 or 1,000 atmospheres at temperatures which may be between 150 and 275° C. Or, if desired, they may be similar to the essentially linear and unbranched polymers which have been referred to as "ultrathenes" and which ordinarily have greater apparent molecular weights (as may be determined from such characteristics as their melt viscosities and the like) in excess of at least about 20,000 and generally in excess of about 40,000; densities of about 0.94–0.96 gram per cubic centimeter; and melting points in the neighborhood of 125–135° C. They are ordinarily found to have a more crystalline nature than conventional polyethylenes and may contain less than 3.0 and even less than 0.3 methyl radical per 100 methylene groups in the polymer molecule. The essentially linear and unbranched polymers of ethylene may be obtained under relatively low pressures of 1 to 100 atmospheres using such catalysts for polymerizing the ethylene as mixtures of strong reducing agents and compounds of group IV–B, V–B and VI–B metals of the periodic system; chromium oxide on silicated alumina; hexavalent molybdenum compounds; and charcoal supported nickel-cobalt.

The haloethylene polymer resin employed in the latex emulsion for coating the polyethylene surface may advantageously be a saran copolymer such as a copolymer of vinylidene chloride and vinyl chloride or a copolymer of vinylidene chloride and acrylonitrile or a copolymer or vinylidene chloride and acrylic acid or its ester derivatives. If desired, however, the haloethylene polymer resin that is utilized in the coating latex emulsion may be polyvinylchloride or a copolymer of vinyl chloride and vinyl acetate that contains at least about 80 percent by weight of vinyl chloride polymerized in the coplymer molecule. It is particularly advantageous to employ crystalline saran copolymers in the latex emulsions to be coated on the polyethylene surfaces and even more advantageous in many instances to utilize such copolymers of vinyl chloride and vinylidene chloride as may contain at least about 80 percent by weight of vinylidene chloride polymerized in the copolymer molecule or such copolymers of vinylidene chloride and acrylonitrile as may contain at least about 60 and, preferably, from 85 to 95 percent by weight of vinylidene chloride polymerized in the copolymer molecule.

The surface active polyelectrolyte materials that are employed in the practice of the invention and which are of the general class of such materials that may be defined as being neutral water soluble sodium salts of arylsulfonic acids which have been condensed (generally with formaldehyde or an equivalent condensing agent) are thought, upon the basis of reasonable information and belief, to be a product of the general type that has been disclosed and is covered in United States Letters Patent Nos. 1,232,620; 1,237,405; 1,281,494 and 1,336,759. As has been indicated, they are the type of materials that are popularly referred to and known as being "Tamol X" and "Tamol N" which are the trade-designations under which they are available from Rohm & Haas Company of Philadelphia, Pennsylvania. Surprising as it may seem, the utilization of "Tamol X" or "Tamol N," or both, provides superlative results and secures to a marked extent the purposes that are intended to be accomplished by the invention while an exactly similar use of many other surface active materials, as is hereinafter demonstrated, does not significantly affect or influence the adhesion of the halo-ethylene polymer coating composition to the polyethylene surface. This is so even when surface active materials that have a remarkable ostensible similarity to "Tamol X" or "Tamol N" are involved.

Between about 0.1 and 5.0 percent by weight of the indicated type of surface active material, based on the weight of the haloethylene polymer resin in the latex emulsion coating composition, may advantageously be incorporated in the latex emulsion coating composition to ameloriate its adherence and bonding to the surface of the polyethylene to be coated. In many instances it may be more advantageous to employ an amount of the surface active material that is between about 0.5 to 3.0 percent by weight of the polymer solids. The surface active additament is usually best directly incorporated as a relatively concentrated aqueous solution in the latex emulsion coating composition. In this connection, the surface active material may frequently be beneficially employed as the emulsion stabilizer for the haloethylene polymer latex coating composition.

In order to secure better adhesion of the coating latex emulsion compositions, it may be beneficial to utilize a flame treatment or the like on the uncoated surface of the polyethylene to augment its wettability. The coating may be accomplished by various spread, dip, brush, spray or other casting techniques.

Advantageously, the composite film structures may be suitably formed by spread coating a latex preparation having in the neighborhood of 50 percent by weight of the haloethylene polymer resin solids that, as has been mentioned, contains the incorporated surface active material as an emulsifier for the system. After application, the surface active material-containing haloethylene polymer resin latex emulsion compositions may be dried according to usual and conventional techniques to effect a solid deposition of the tightly-adhering resin layer in the composite structure. The particular drying conditions that are required (insofar as whether room temperatures or heat at elevated temperatures is necessary to best dry the applied latex emulsion) depends, as will be apparent to those skilled in the art, to a great extent upon the characteristics of the particular haloethylene polymer resin that is involved.

The pH of the latex coating composition may have to be adjusted to avoid undesired coagulation while accommodating the incorporated surface active material. While different thicknesses may also be beneficial, it is desirable for the applied and finally dried layer of haloethylene polymer resin on the surface of the polyethylene article to be at least about 0.02 mil thick and even more desirable for it to have a thickness between 0.1 and 2.0 mils. As is apparent, films may, if desired, be coated on both of their surfaces in accordance with the invention. In a similar manner, all of the coatable surfaces of other articles such as both of the inner and outer surfaces of containers and the like or either surface or any desired portion of a particular surface may, as desired, be provided with the polyelectrolyte-containing haloethylene polymer resin coating.

By way of further illustration a number of polyethylene films were coated to a 0.10 mil thickness with a saran polymer resin that consisted of a copolymer of acrylonitrile and vinylidene chloride containing about 89 percent by weight of vinylidene chloride polymerized in the copolymer molecule. The coatings were applied by conventional spread techniques from various latex formulations containing about 50 percent by weight of polymeric solids in which different surface active materials were incorporated. The polyethylene film which was employed had a thickness of about 1 mil and was of the type which is known as "Dura-Clear" polyethylene film and which is obtainable from The Harwid Company of Boston, Massachusetts. After the coatings had dried on the polyethylene film samples, the composite film structures were tested for the adhesive properties of the applied coatings on the film at room temperature by determining the force in grams that was necessary to strip or peel a ¾ inch wide layer of the coating from the film. The results are given in the following tabulation in which the surface active agents that were incorporated in each of the coating formulations are identified and which includes the quantities of the surface active agent that were employed.

| Trade designation of surface active agent employed in formulation | Type of material | Available from— | Quantity of surface active agent employed in percent by weight, based on polymer solids | Force in gms. necessary to peel ¾″ strip of applied coating |
|---|---|---|---|---|
| Polyglycol 31 | Butyl phenol monoether of a polyethylene glycol | The Dow Chemical Co. | 3 | 125 |
| Triton X-100 | Alkyl aryl polyether alcohol | Rohm & Haas Co. | 3 | 115 |
| Aerosol MA | Dihexyl ester of sodium sulfosuccinic acid | American Cyanamid Co. | 3 | 65 |
| Do | do | do | 1 | 65 |
| Victawet 58B | Na₅(capryl)₅(P₃O₁₀)₂ | Victor Chemical Works | 3 | 35 |
| Igepal CA | Alkyl phenoxy polyoxyethylene ethanol | Antara Chemicals Div. of General Dyestuffs Corp. | 3 | 40 |
| Ultrawet DS | Alkyl benzene sodium sulfonate | Atlantic Refining Co. | 3 | 40 |
| Daxad 11 | Naphthalene sulfonic acid | Dewey & Almy Chemical Co. | 3 | About 40 |
| Daxad 11KLS | Low salt concentration potassium salt of alkyl naphthalene sulfonic acid. | do | 3 | About 40 |
| Darvan No. 1 | Sodium salt of polymeric alkyl aryl sulfonic acid (probably formaldehyde condensation product). | R. T. Vanderbilt & Co. | 3 | About 40 |
| Lomar PW | Sodium salt of condensed mononaphthylene sulfonic acid | Jacques Wolf & Co. | 3 | About 40 |
| Lomar PWA | Ammonium salt of condensed mononaphthylene sulfonic acid | do | 3 | About 40 |
| Tamol X | Neutral sodium salt of condensed arylsulfonic acid | Rohm & Haas Co. | 3 | 750 |
| Tamol N | do | do | 3 | 750 |

The films coated with the "Tamol X" and "Tamol N"-containing latex formulations had good flexibility and did not become embrittled at temperatures as low as −20° C. In addition, their effectiveness as water vapor barriers was commensurate to that which is obtainable from conventional saran films. Further, they had excellent clarity and transparency. Their degree of haziness was reduced substantially completely in comparison to that which is present in the original polyethylene films with which they were prepared.

Similar results may be obtained when other proportions of "Tamol X" and "Tamol N" or their mixtures within the scope of the invention are incorporated in the latex coating composition and when compositions of other haloethylene polymer resins are employed. Films of essentially linear and unbranched polyethylene may also be satisfactorily coated in the foregoing manner.

Certain changes and modifications in the practice of the present invention can be readily entered into without departing substantially from its intended spirit and scope. Therefore, it is to be fully understood that the invention is not to be limited or in any way restricted by the preferred embodiments thereof which are set forth in the foregoing description and specification. Rather, it is to be interpreted and construed in the light of what is set forth and detailed in the hereto appended claims.

What is claimed is:

1. Method for coating a polyethylene article with a haloethylene polymer resin which comprises applying, as a coating composition, a layer of a latex emulsion of a haloethylene polymer resin in which there has been incorporated a minor proportion of a surface active polyelectrolyte material over the polyethylene surface, said surface active polyelectrolyte material containing a plurality of ionizable groups in its molecule which is a water-soluble neutral sodium salt of condensed arylsulfonic acids in a coating composition consisting of a latex emulsion of said haloethylene polymer resin; and subsequently drying the applied latex emulsion of the haloethylene polymer resin to effect a solid deposition of resin on the surface of the polyethylene.

2. The method of claim 1, wherein between about 0.1 and 5 percent by weight of the surface active polyelectrolyte material is incorporated in the coating composition, based on the weight of the haloethylene polymer resin contained therein.

3. The method of claim 1, wherein between about 0.5 and 3 percent by weight of the surface active polyelectrolyte material is incorporated in the coating composition, based on the weight of the haloethylene polymer resin contained therein.

4. The method of claim 1, wherein the polyethylene article is a film having a thickness which is not in excess of about 20 mils.

5. The method of claim 1, wherein the polyethylene article is a film having a thickness which is between about 0.5 and 5 mils.

6. The method of claim 1, wherein the layer of the haloethylene polymer resin which is applied over the surface has a thickness of at least about 0.02 mil.

7. The method of claim 1, wherein the layer of the haloethylene polymer resin which is applied over the surface has a thickness of between about 0.1 and 2.0 mils.

8. Composite structure which comprises a polyethylene article coated with a tightly-adhering layer of a haloethylene polymer resin in which there is incorporated a minor proportion of a surface active polyelectrolyte material that contains a plurality of ionizable groups of its molecule, said surface active polyelectrolyte material being a water soluble neutral sodium salt of condensed arylsulfonic acids.

9. The composite structure of claim 8, wherein the applied coating has a thickness of at least 0.02 mil.

10. The composite structure of claim 8, wherein the applied coating has a thickness between about 0.1 and 2.0 mils.

11. The composite structure of claim 8, wherein the polyethylene article is a film having a thickness between about 0.5 and 5 mils.

12. The composite structure of claim 8, wherein the haloethylene polymer contains between about 0.1 and 5.0 percent by weight of the surface active polyelectrolyte material incorporated therein.

13. The composite structure of claim 8, wherein the haloethylene polymer contains between about 0.5 and 3.0 percent by weight of the surface active polyelectrolyte material incorporated therein.

14. The composite structure of claim 8, wherein the haloethylene polymer resin is comprised of a crystalline vinylidine chloride polymer.

15. The composite structure of claim 8, wherein the haloethylene polymer resin is comprised of a copolymer which contains acrylonitrile and vinylidene chloride polymerized in its molecule.

16. The composite structure of claim 8, wherein the polyethylene article is derived from an essentially linear and unbranched polyethylene having a molecular weight in excess of about 40,000; a density between about 0.94 and 0.96 gram per cubic centimeter; and a melting point in the neighborhood of 125–135° C.

References Cited in the file of this patent

UNITED STATES PATENTS

| | | |
|---|---|---|
| 2,628,208 | Loukomsky | Feb. 10, 1953 |
| 2,648,097 | Kritchever | Aug. 11, 1953 |
| 2,675,339 | Zenftman | Apr. 13, 1954 |
| 2,715,076 | Wolinski | Aug. 9, 1955 |